(12) United States Patent
Zappella et al.

(10) Patent No.: US 11,500,937 B1
(45) Date of Patent: Nov. 15, 2022

(54) DATA RETRIEVAL SYSTEM

(71) Applicant: Apple Inc., Cupertino, CA (US)

(72) Inventors: Luca Zappella, Sunnyvale, CA (US); Siddharth Khullar, Santa Clara, CA (US); Till M. Quack, Mountain View, CA (US); Xavier Suau Cuadros, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1033 days.

(21) Appl. No.: 16/043,076

(22) Filed: Jul. 23, 2018

Related U.S. Application Data

(60) Provisional application No. 62/536,348, filed on Jul. 24, 2017.

(51) Int. Cl.
| | | |
|---|---|---|
| G06F 16/00 | (2019.01) | |
| G06F 16/9032 | (2019.01) | |
| G06N 3/04 | (2006.01) | |
| G06F 3/04847 | (2022.01) | |
| G06F 16/51 | (2019.01) | |

(52) U.S. Cl.
CPC .... G06F 16/90328 (2019.01); G06F 3/04847 (2013.01); G06F 16/51 (2019.01); G06N 3/04 (2013.01)

(58) Field of Classification Search
CPC .. G06F 16/90328; G06F 16/434; G06F 16/41; G06F 16/53; G06F 16/51; G06F 3/04847
USPC .......................................................... 707/769
See application file for complete search history.

(56) References Cited

U.S. PATENT DOCUMENTS

| | | | |
|---|---|---|---|
| 10,043,109 B1* | 8/2018 | Du | G06N 3/0454 |
| 10,824,942 B1* | 11/2020 | Bhotika | G06F 16/51 |
| 2017/0098124 A1* | 4/2017 | Jonsson | G06K 9/628 |
| 2017/0098152 A1* | 4/2017 | Kerr | G06F 3/04842 |
| 2019/0005069 A1* | 1/2019 | Filgueiras de Araujo | G06K 9/4671 |

* cited by examiner

*Primary Examiner* — Thu Nguyet T Le
(74) *Attorney, Agent, or Firm* — Robert C. Kowert; Kowert, Hood, Munyon, Rankin & Goetzel, P.C.

(57) ABSTRACT

A system for selecting different aspects of data objects to be matched with similar aspects of other data objects. A user inputs a search data object and a value. A neural network computes features for the search object at multiple layers that correspond to different aspects of the object. A descriptor is generated for the search object from features output at a layer position of the neural network determined from the value. The descriptor is compared to corresponding descriptors for objects in a collection to select objects that include aspects similar to an aspect of the search object. The user can change the value to view different objects that include aspects similar to other aspects of the search object. Thus, the user can explore different aspects of an object to find objects that include aspects similar to the aspect of the object that the user is interested in.

20 Claims, 12 Drawing Sheets

DATA RETRIEVAL SYSTEM

This application claims benefit of priority to U.S. Provisional Application Ser. No. 62/536,348, entitled "DATA RETRIEVAL SYSTEM," filed Jul. 24, 2017, and which is incorporated herein by reference in its entirety.

BACKGROUND

Data retrieval systems (e.g., image retrieval systems) use an input data object (e.g., an image) provided as an example as a query to retrieve similar data objects from a large collection of data objects. Data retrieval systems may be trained to find particular aspects of data objects; for example, an image retrieval system may be trained to find images with similar lighting conditions. However, retrieval queries may be ambiguous, since the same data object could be used in queries with different expectations on what should be considered similar. For example, in an image retrieval system, an outdoor image that shows a cyclist on a road could be submitted as a query for images that contain cyclists, but could also be submitted as a query for images that contain other content irrespective of whether the images might contain a cyclist.

SUMMARY

Embodiments of a data retrieval system are described that allow users to select different aspects of search data objects to be matched with similar aspects of other data objects in a collection, thus resolving the ambiguity of retrieval queries in conventional data retrieval systems. The data retrieval system includes a neural network (e.g., a deep neural network) that characterizes data objects and computes features for input data objects that correspond to different aspects of the data objects at multiple layers in the neural network. The data retrieval system also includes an interface that allows a user to input a search data object and to input a value, for example via a slider bar user interface element, corresponding to a layer position in the neural network. A descriptor is generated for the search data object from features output at a layer position of the neural network determined from the input value. In some examples, a layer position refers to a particular layer of the neural network, in which case a descriptor is generated from features output by that layer. In some examples, a layer position refers to a position between two layers, in which case a descriptor is generated from a combination of features output by the two closest layers. The generated descriptor is compared to corresponding neural network layer descriptors for data objects in a collection of data objects to select one or more of the data objects in the collection that include aspects similar to an aspect of the search data object represented in the descriptor. Indications of the selected data object(s) may be displayed to the user via the interface. The user can change the value, for example by moving the slider bar, to view different sets of data objects that include aspects similar to other aspects of the search data object. Embodiments of the data retrieval system thus allow the user to explore different aspects of the search data object (e.g., a query image) to find a set of data objects that include aspects similar to the aspect of the search data object that the user is interested in.

In some embodiments, the data retrieval system is used to index data objects, in addition to uses in retrieval operations in which different sets of data objects (e.g., images or parts of images) are retrieved from a collection of data objects based on features computed for a search data object at different layer positions of a neural network. In an indexing operation, an input data object and descriptors generated for the input data object based on features computed at one or more layer positions of a neural network may be added to a collection of data objects. The collection of data objects can then be used in retrieval operations.

The data objects are, for example, digital images (e.g., still images or video frames captured by conventional digital camera systems, images captured in remote sensing systems including but not limited to Light Detection and Ranging (LIDAR) systems, etc.), or portions of images. In some embodiments, the data retrieval system can index and retrieve other types of data objects, for example audio or sound files or clips, or various types of textual and/or numerical data files.

DETAILED DESCRIPTION

Figure 1:
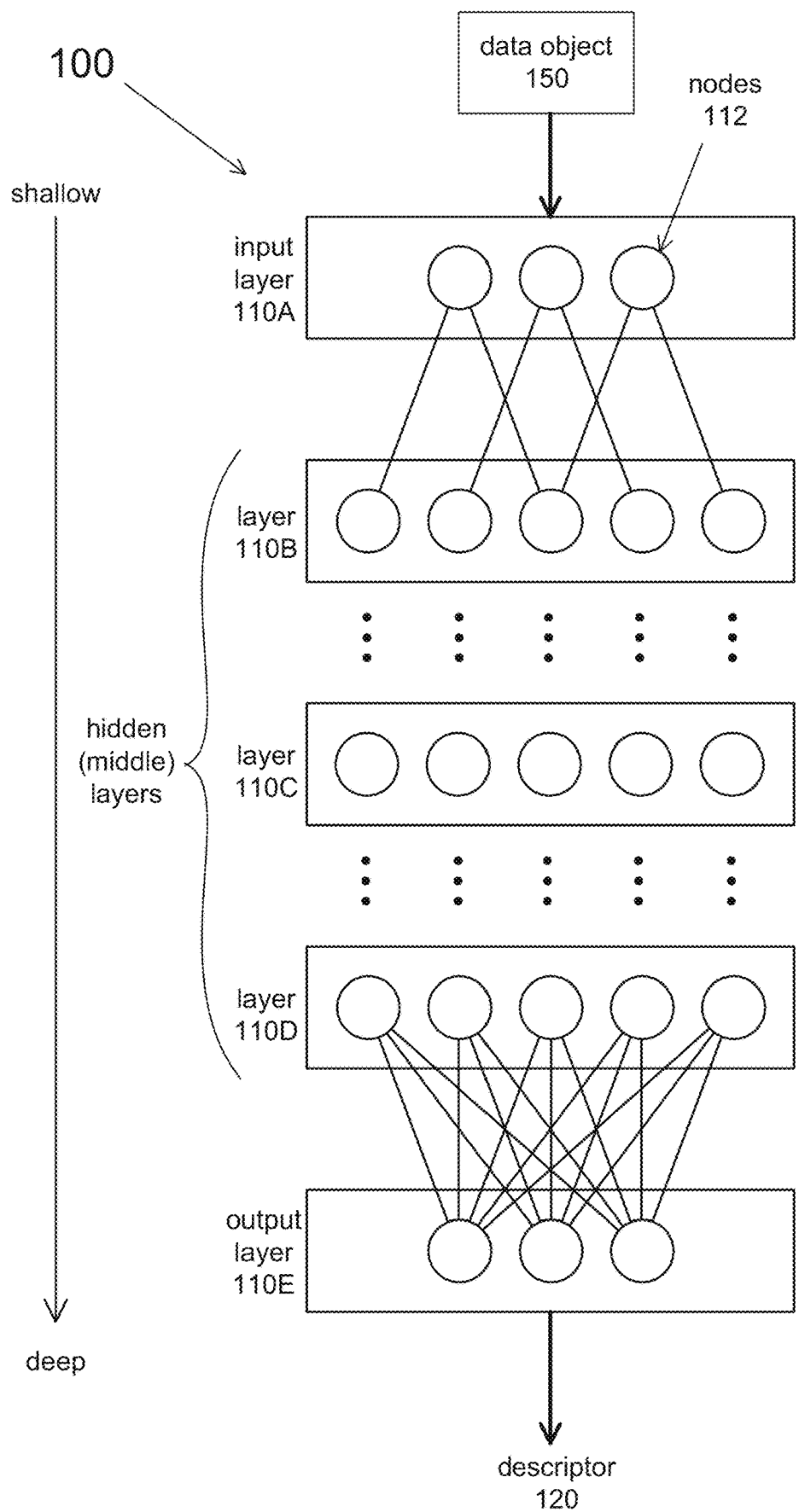
FIG. 1 illustrates an example neural network.

Embodiments of a data retrieval system are described that allow users to select different aspects of search data objects to be matched with similar aspects of other data objects in a collection, thus resolving the ambiguity of retrieval queries in conventional data retrieval systems. The data objects are, for example, digital images (e.g., still images or video frames, LIDAR images, etc.), or portions of images. In some embodiments, the data retrieval system can index and retrieve other types of data objects, for example audio or sound files or clips, or various types of textual and/or numerical data files.

Embodiments of the data retrieval system include a neural network (e.g., a deep neural network) that characterizes data objects and computes features for search data objects that correspond to different aspects of the data objects at multiple layers in the neural network. Note that the neural network does not have to be trained explicitly to compute the features; the neural network computes the features as a side effect of training the neural network with a sufficiently large training set. Embodiments of the data retrieval system also include a retrieval engine that selects data objects from a collection based on descriptors generated from features computed at different layer positions of the neural network.

Embodiments of the data retrieval system also include a user interface that obtains search data objects from users, and that obtains input values, for example via a slider bar user interface element, corresponding to different layer positions in the neural network. Descriptors may be generated for search data objects from features output at layer positions of the neural network determined from the input values. In some examples, a layer position refers to a particular layer of the neural network, in which case a descriptor is generated from features output by that layer. In some examples, a layer position refers to a position between two layers, in which case a descriptor is generated from a combination of features output by the two closest layers. The generated descriptor is then compared to corresponding neural network layer descriptors for data objects in a collection of data objects to select one or more of the data objects in the collection that include aspects similar to the aspect(s) of the search data object represented in the descriptor. Indications of the selected data object(s) may be displayed to the user via the interface. The user may change the input value, for example by moving the slider bar; in response, a new layer position may be determined, a descriptor may be generated for the search data object from features output by one or more layers at the new layer position, and a new set of data objects may be selected from the collection based on the new descriptor and displayed to the user.

Embodiments of the data retrieval system thus allow a user to explore different aspects of the search data object (e.g., a query image) to find a set of data objects that include aspects similar to the aspect of the search data object that the user is interested in. As an example, the user may submit an outdoor image that shows a cyclist on a road as a query image, and by moving the slider bar may view sets of images that contain cyclists, that have similar backgrounds or lighting conditions, or that have other aspects similar to the query image irrespective of whether the images contain a cyclist. Note that the user need not be aware that the position of the slider bar corresponds to layer positions of a neural network; to the user, different positions on the slider bar return different sets of images that correspond to different aspects of the query image as results.

In some embodiments, the data retrieval system is used to index data objects, in addition to uses in retrieval operations in which different sets of data objects (e.g., images or parts of images) are retrieved from a collection of data objects based on features computed for a search data object at different layer positions of a neural network. In an indexing operation, an input data object and descriptors generated for the input data object based on features computed at two or more layer positions of a neural network may be added to a collection of data objects. The collection of data objects can then be used in retrieval operations.

FIG. 1 illustrates an example neural network that generates a descriptor for a data object; the descriptor is used to index the data object or to locate similar data objects in a collection. Example neural network 100 is a deep neural network (DNN). A deep neural network includes at least three layers; an input layer, an output layer, and one or more layers, referred to as middle or hidden layers, between the input layer and output layer. FIG. 1 shows a non-limiting example neural network 100 that includes an input layer 110A, an output layer 110E, and three hidden layers 110B-110D. Each layer 110 includes one or more nodes 112 that each perform a computation on input data to generate output data. The input layer 110A computes features for an input data object 150; each subsequent layer 110 computes additional features for the input data object 150 based at least in part on the features output from the previous layer 110 The features computed at the different layers 110 characterize different aspects of the input data object 150.

A layer of a neural network may be fully-connected or not fully-connected (referred to as convoluted). In a fully-connected layer 110, each node 112 in the layer 110 is connected to every node 112 in the previous layer 110. In a convoluted layer 110, each node 112 in the layer 110 is connected to one or more, but not every, node 112 in the previous layer 110. A neural network 100 may include only fully-connected layers 110, only convoluted layers 110, or a mix of fully-connected and convoluted layers 110. In FIG. 1, layer 110E is shown as an example of a fully-connected layer 110, as each node 112 in layer 110E is connected to every node 112 in layer 110D, and layer 110B is shown as an example of a convoluted layer 110, as each node 112 in layer 110B is connected to one or more, but not every, node 112 in layer 110A.

A neural network 100 as illustrated in FIG. 1 may, for example, be used in data retrieval operations. In a conventional retrieval operation, a single descriptor 120 is generated for an input data object 150 from features output by one layer 110 of the neural network 100, for example from features output by the output layer 110E as shown in FIG. 1. The descriptor 120 describes some aspect of the input data object 150 at that layer 110. For example, in an image retrieval operation, a descriptor 120 generated from features output by the output layer 110 typically describes semantic content of an input image (i.e., objects such as bicycles, people, or faces). The descriptor 120 is compared to corresponding descriptors for data objects in a collection to select one or more data objects in the collection that include aspects that are similar to an aspect of the input data object 150 as represented in the descriptor 120. In a conventional retrieval operation, a set of data objects is returned that include aspects that best match the aspect described by the single descriptor 120 for the input data object 150. For example, in an image retrieval operation, a set of images that include objects similar to an object or objects in the input image may be returned.

However, a user may be interested in searching for data objects that include aspects similar to aspects of the input data object 150 other than the aspect described by the single descriptor 120 for the input data object 150. For example, an outdoor image that shows a vehicle on a road could be submitted as a query for images that contain similar vehicles; however, the user may want to locate images with similar backgrounds or lighting conditions to the outdoor image whether or not the images contain similar vehicles. Conventional data retrieval operations do not know the expectations of the user, search for data objects that include aspects similar to the aspect described by the single descriptor 120 for the input data object 150, and so return the same set of data objects (e.g., a set of images that contain vehicles) for the query regardless of the user's expectations in performing the query.

Embodiments of the data retrieval system allow users to select different aspects of search data objects to be matched with similar aspects of other data objects in a collection, thus resolving the ambiguity of retrieval queries in conventional data retrieval operations. The data retrieval system includes a neural network (e.g., a deep neural network) that characterizes data objects and computes features for input data objects that correspond to different aspects of the data objects at multiple layers in the neural network and a user interface that obtains a search data object from a user and obtains a value corresponding to a layer position in the neural network from the user, for example via a slider bar user interface element. A descriptor is generated for the search data object from features output at a layer position of the neural network determined from the input value. The generated descriptor is then used to select one or more of the data objects in a collection that include aspects similar to an aspect of the search data object represented in the descriptor. Indications of the selected data object(s) may be displayed on the user interface. The user can change the input value, for example by moving the slider bar, to view different sets of data objects that include aspects similar to other aspects of the search data object. Thus, embodiments of the data retrieval system allow the user to explore different aspects of the search data object (e.g., a query image) to find a set of data objects that include aspects similar to the aspect of the search data object that the user is interested in.

In some embodiments, the descriptors output by the layer positions are "flat" descriptors (i.e., vectors). However, in some examples, at least one layer position outputs a tensor (i.e., a set of matrices). In some embodiments, the tensor is "flattened" to generate a long vector descriptor. In some embodiments, a pooling operation is performed to reduce the size of the tensor and thus of the descriptor.

Figure 2:
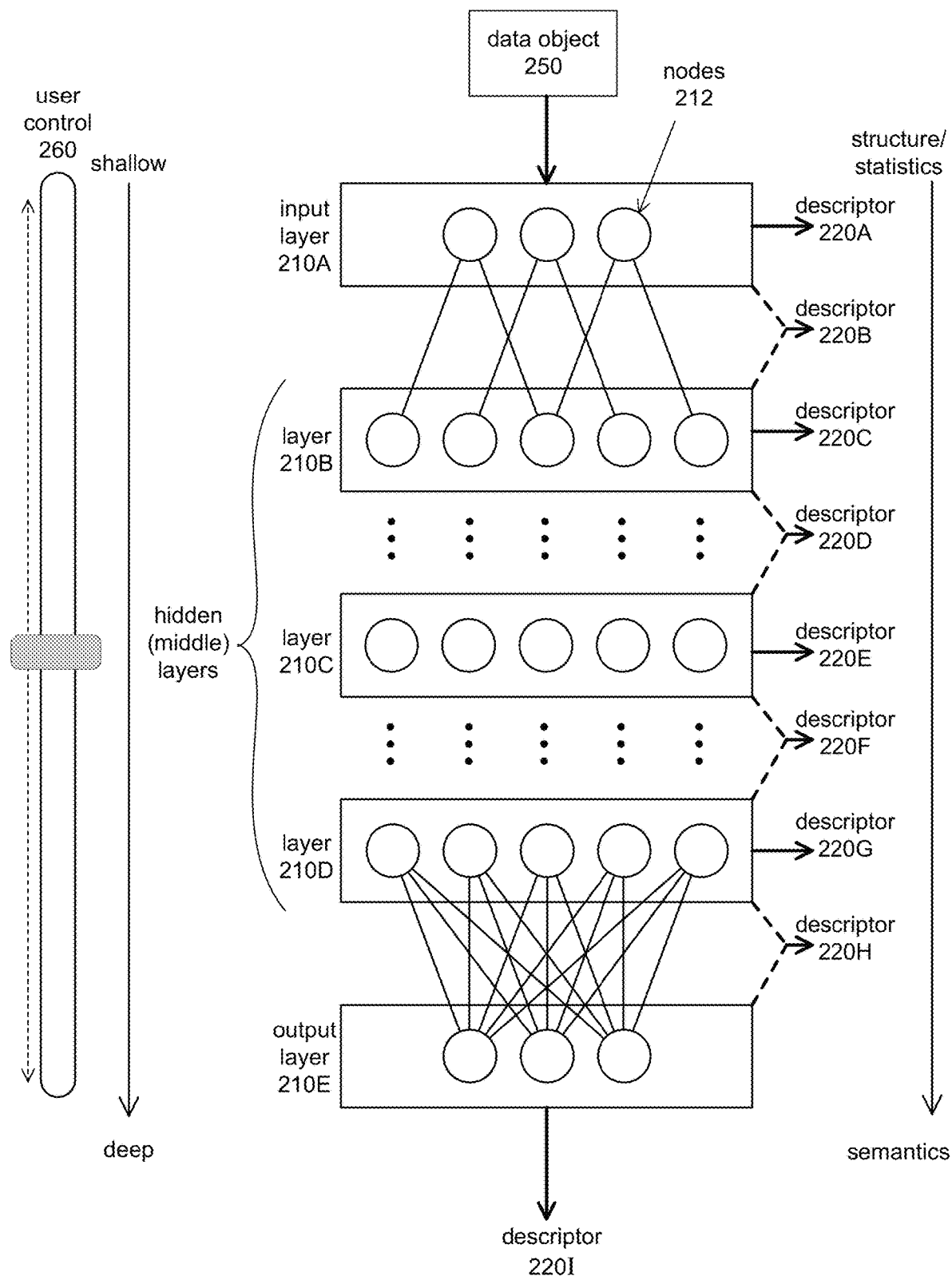
FIG. 2 illustrates generating descriptors for a search data object that correspond to different aspects of the data object at multiple layer positions in a neural network, according to some embodiments.

FIG. 2 illustrates generating descriptors for a search data object that correspond to different aspects of the data object at multiple layer positions in a neural network, according to some embodiments. FIG. 2 shows a non-limiting example deep neural network 200 that includes an input layer 210A, an output layer 210E, and three hidden layers 210B-210D. Each layer 210 includes one or more nodes 212 that each perform a computation on input data to generate output data corresponding to features of an input data object 250 (e.g., an image or portion of an image). A neural network may have more or fewer layers than shown in this example, and the layers may have different numbers of compute nodes. A neural network 200 may include only fully-connected layers 210, only convoluted layers 210, or a mix of fully-connected and convoluted layers 210. In FIG. 2, layer 210E is shown as an example of a fully-connected layer 210, and layer 210B is shown as an example of a convoluted layer 210.

The input layer 210A computes features for an input data object 250; each subsequent layer 210 computes additional features for the input data object 250 based at least in part on the features output from the previous layer 210. The features computed at the different layers 210 characterize different aspects of the input data object 250. Features output at shallower layers 210 are generally structural or statistical features of the input data object 250 such as background and lighting features of an image, while features output at deeper layers 210 include semantic features such as edges and details of objects in an image.

In contrast to conventional systems in which a single descriptor is generated for a data object from features computed by a neural network, embodiments of the data retrieval system generate descriptors 220 from features at multiple layer positions in a neural network 200 as shown in FIG. 2. In some examples, a layer position refers to a particular layer 210 of the neural network 200, in which case a descriptor 220 is generated from features output by that layer 210. In some examples, a layer position refers to a position between two layers 210 of the neural network 200, in which case a descriptor 220 is generated from a combination of features output by the two closest layers 210. In FIG. 2, descriptors 220A, 220C, 220E, 220G, and 220I are shown as examples where the layer position is at a particular layer 210, and descriptors 220B, 220D, 220F, and 220H, are shown as examples where the layer position is between two layers 210.

Embodiments of the data retrieval system use a neural network 200 as illustrated in FIG. 2 in performing indexing and retrieval operations. In an indexing operation, an input data object 250 and descriptors 220 generated for the input data object 250 at two or more layer positions are added to a collection of data objects. In a retrieval operation, a descriptor 220 generated for an input data object 250 generated from features at a layer position determined from a current value of a user control 260 (e.g., a slider bar) is compared to corresponding descriptors 220 for data objects in a collection to select one or more data objects in the collection that include aspects that are similar to an aspect of the input data object 250 as represented in the descriptor 220.

As noted above, in some examples a layer position is between two layers 210 of the neural network 200, in which case a descriptor 220 is generated from a combination of features output by the two closest layers 210. In some embodiments, the two layers 210 are given equal weight when comparing the descriptors to descriptors of data objects in the collection. However, in some embodiments, the two layers 210 are given different weights, for example based on the location of the layer position relative to the two layers 210. For example, if the layer position is halfway between the two layers 210, the two layers 210 are given equal weight, but if the layer position is closer to one layer 210 than the other layer 210, the two layers 210 are given different weights, for example 0.25 for the layer farther from the layer position and 0.75 for the layer closer to the layer position.

Figure 3A:
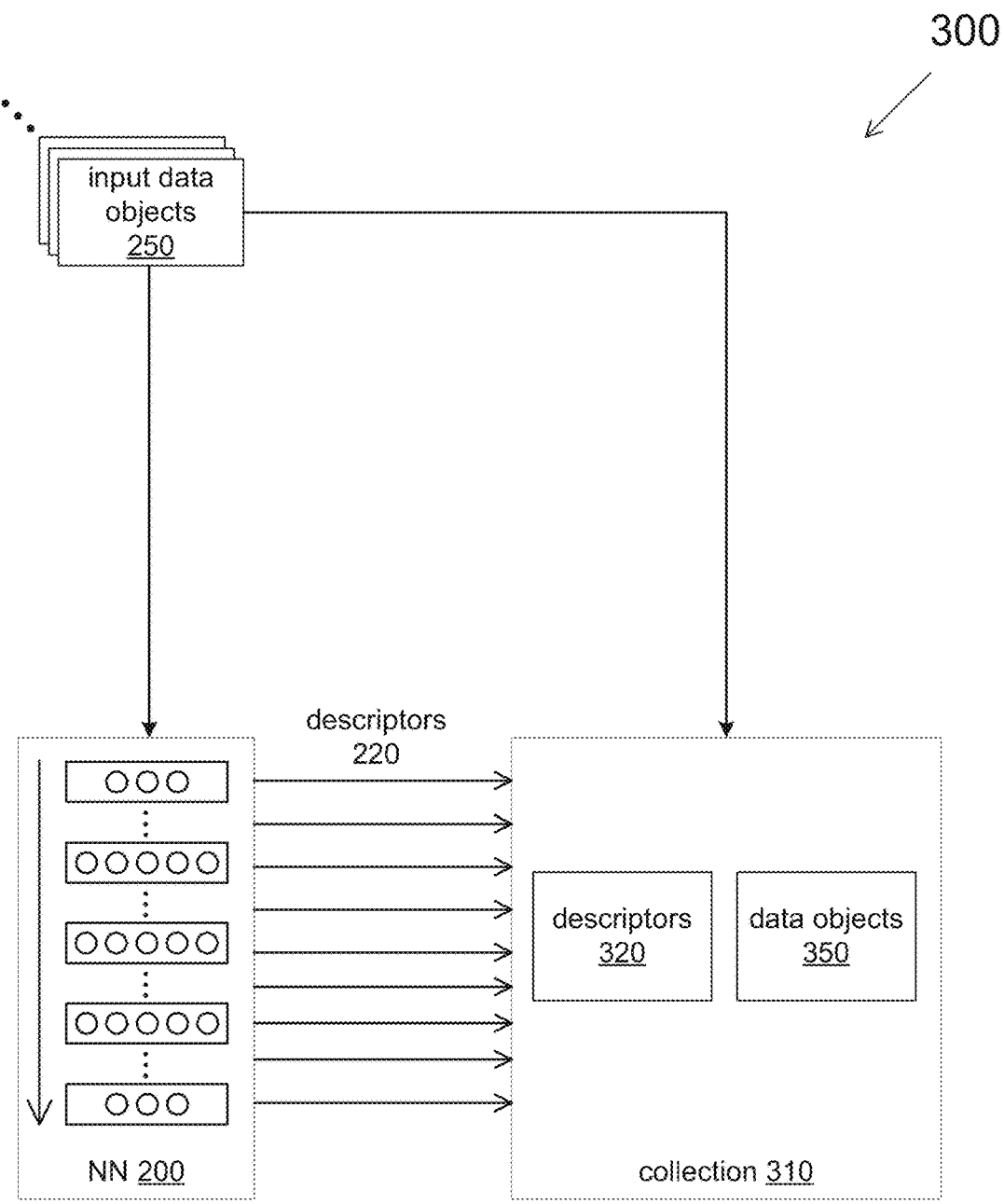
FIGS. 3A through 3C illustrate a data retrieval system that allows a user to select different aspects of a search data object to be matched with similar aspects of other data objects in a collection, according to some embodiments.
Figure 3B:
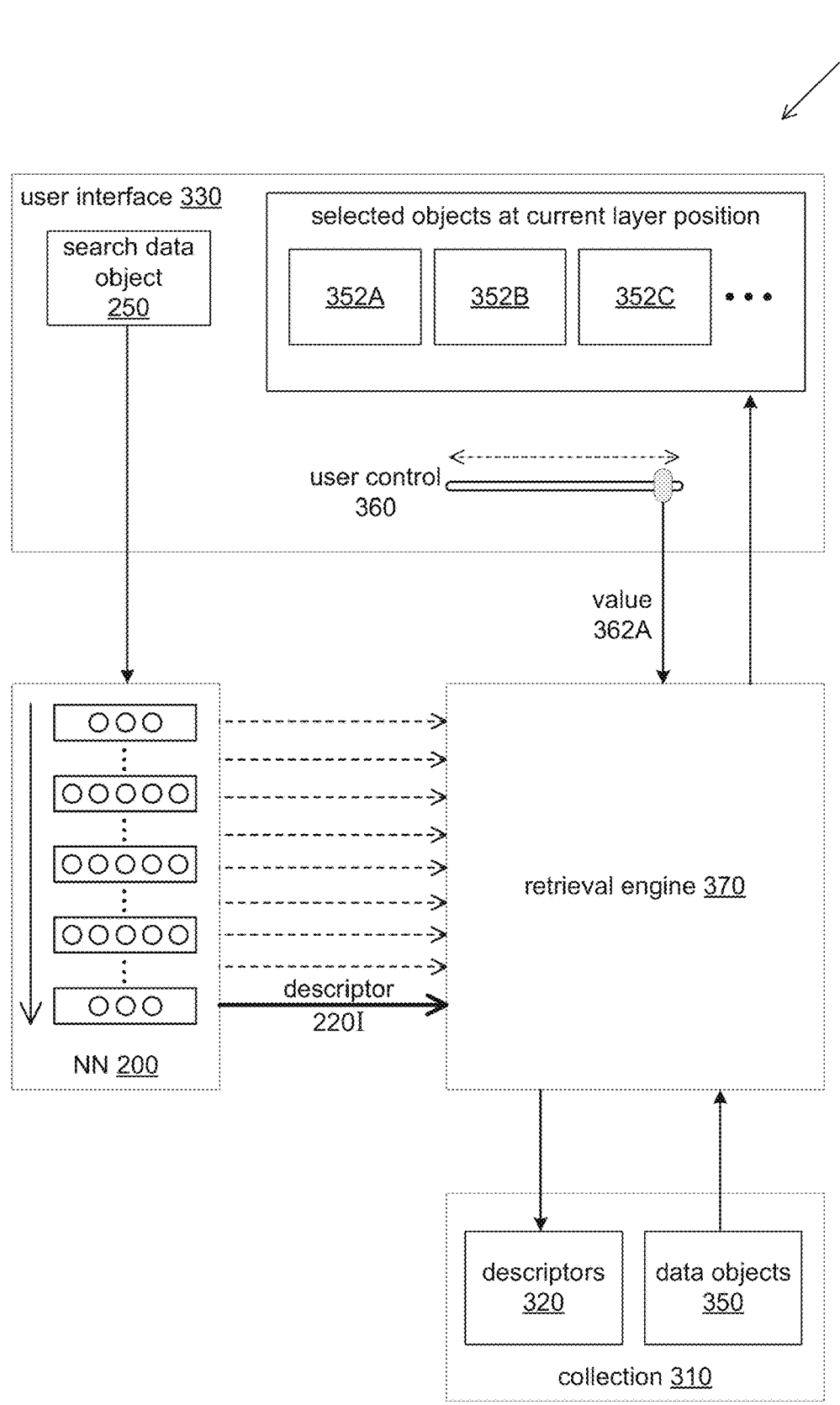
Figure 3C:
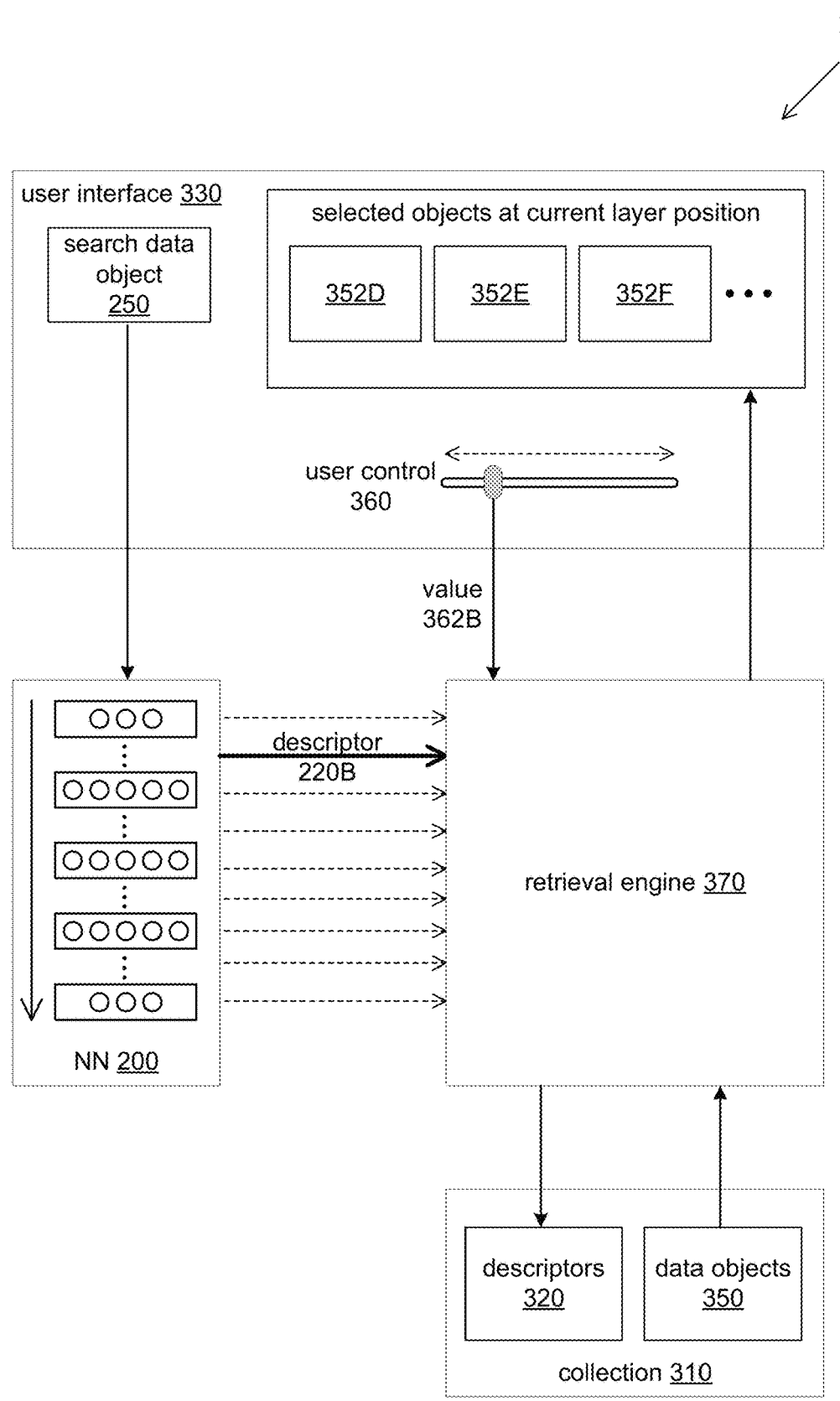

FIGS. 3A through 3C illustrate a data retrieval system 300 that allows a user to select different aspects of a search data object to be matched with similar aspects of other data objects in a collection, according to some embodiments. Data retrieval system 300 may be used to perform indexing and retrieval operations on a collection 310 that includes data objects 350 associated or tagged with descriptors 320. Data retrieval system 300 includes a neural network 200 (e.g., a deep neural network) that characterizes data objects 250 and computes features for input data objects 250 that correspond to different aspects of the data objects at multiple layers in the neural network 200. Data retrieval system 300 also includes a user interface 330 that obtains search data objects 250 from the user, and that obtains input values corresponding to different aspects of the search data objects from the user via a user control 360 such as a slider. The input values map to layer positions in the neural network 200. The data retrieval system 300 also includes a retrieval engine 370 that selects data objects 350 from the collection 310 based on descriptors 250 generated from features for an input data object 250 computed at different layer positions of the neural network 200 corresponding to the input values, and provides indications 352 of the selected data objects 350 to the user interface 330 for display to the user.

FIG. 3A illustrates an indexing operation in which one or more data objects 250 are added to a collection 310 of data objects 350 and input to a neural network 200 to generate descriptors 220 for the input data objects 250, for example as illustrated in FIG. 2. Descriptors 220 generated for the input data object(s) 250 at two or more layer positions of neural network 200 are stored as descriptors 320 that are associated with respective ones of the input data objects 250 added to the collection 310 of data objects 320. In some examples, a layer position is at a particular layer 210 of the neural network 200, in which case a descriptor 220 is generated from features output by that layer 210. In some examples, a layer position is between two layers 210 of the neural network 200, in which case a descriptor 220 is generated from a combination of features output by the two closest layers 210.

The data objects 250 and 350 are, for example, digital images (e.g., still images or video frames, LIDAR images, etc.), or portions of images. In some embodiments, the data retrieval system can index other types of data objects, for example audio or sound files or clips, or various types of textual and/or numerical data files.

Figure 10:
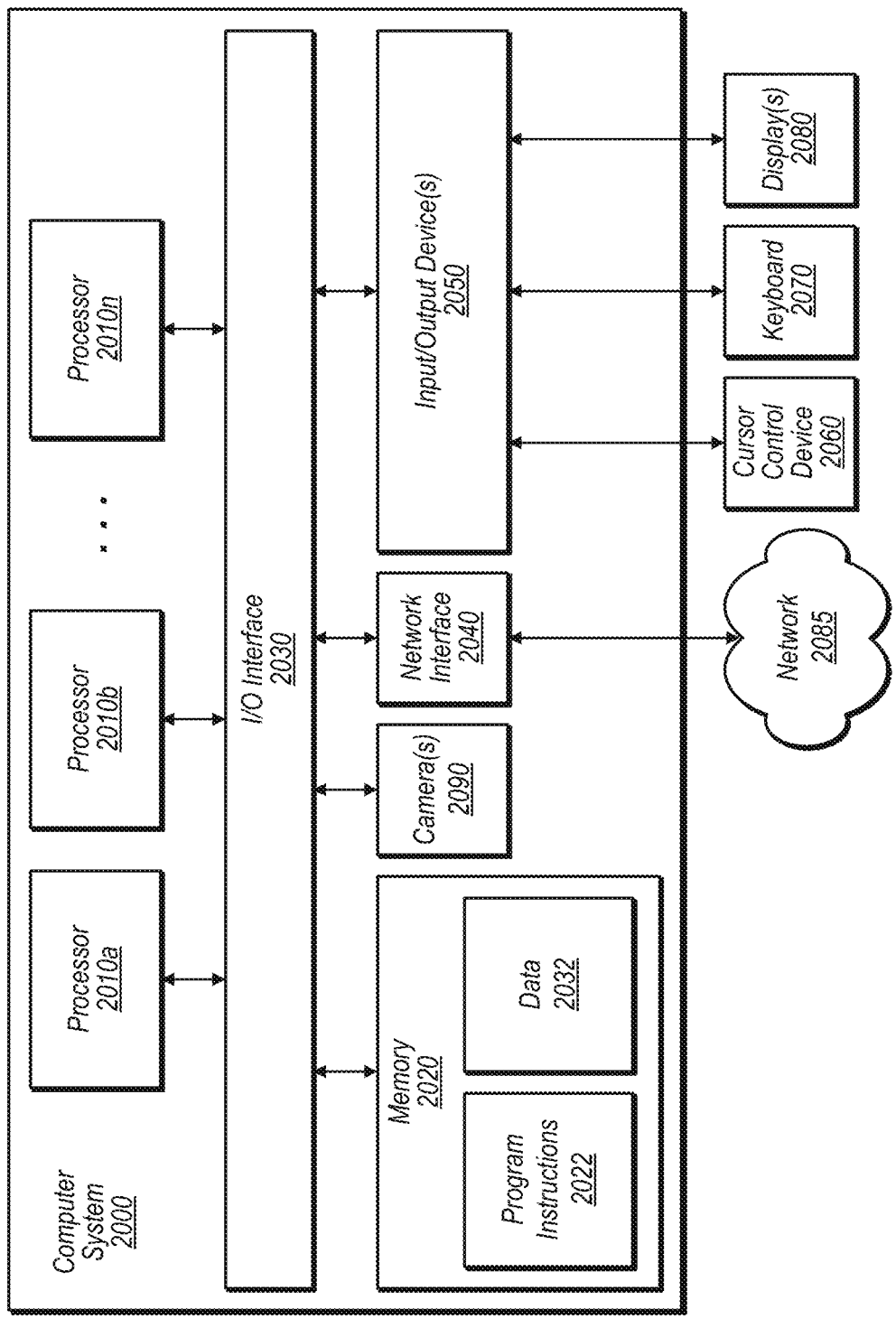
FIG. 10 illustrates an example computer system that may be used in embodiments.

Neural network 200 is implemented on one or more computing devices that include memory and one or more processors (e.g., CPUs, GPUs, etc.) that execute program instructions to perform operations of the neural network 200. An example computing device is illustrated in FIG. 10. Collection 310 is a database or other data structure stored on one or more devices in which descriptors 320 are associated with data objects 350. Collection 310 can be on the same device that implements neural network 200, or can be on one or more separate devices, such as storage devices in a network-based storage system.

FIGS. 3B and 3C illustrate a retrieval operation via which a user selects different aspects of a search data object 250 to be matched with similar aspects of other data objects 350 in a collection 310, according to some embodiments. As shown in FIG. 3B, a user specifies or selects a search data object 250, for example an image or a portion of an image, via user interface 330. The user also specifies a value 362A corresponding to an aspect of the search data object, for example via a user control 360 such as a slider; the value 362A maps to a layer position in the neural network 200. The search data object 250 and value 362A are submitted to data retrieval system 300 as a query. The search data object 250 is input to neural network 200 (e.g., a deep neural network) for characterizing data objects 250 that computes features for search data object 250 that correspond to different aspects of the data object 250 at multiple layers in the neural network 200. The value 362A is mapped to a layer position in neural network 200, for example by the retrieval engine 300. In this example, referring to FIG. 2, the value 362A maps to output layer 210E. Retrieval engine 370 obtains a descriptor 220I generated from features output by layer 210E, or alternatively generates a descriptor 220I from features output by layer 210E. The retrieval engine 370 then compares the descriptor 220I to corresponding neural network layer descriptors 320 for data objects 350 in collection 310 to select one or more data objects 350 in the collection 310 that include aspects similar to the aspect of the search data object 250 that corresponds to value 362A. Indications (352A, 352B, 352C . . . ) of the selected data object(s) 350 are provided to the interface 330 for display to the user. In some embodiments, indications 352 may include graphical representations of the selected data objects 350, such as image thumbnails. In some embodiments, indications 352 may instead or also include textual representations of the selected data objects 350, such as file names and/or descriptions.

The user can review the currently selected data objects 350 via the user interface 310 to determine if the selected data objects 350 are or include what the user is looking for; that is, to determine if the selected data objects 350 exhibit aspects or characteristics similar to aspects or characteristics of the search data object 250 that the user is interested in. For example, for images, the user can view the selected images to determine if the images include background aspects, lighting aspects, color aspects, or semantic content (e.g., foreground objects) that the user is interested in. In some embodiments, the user can select particular indications 352 via user interface 310 to further review the respective data objects 350. For example, the user can select an image thumbnail or image file name to view a higher- or full-resolution version of the image, or select an audio file name to play at least a portion of the audio file. In some embodiments, the search data object 250 (e.g., an image or a portion of an image) can be displayed so that the user can compare the selected data objects 350 to the search data object 250.

The currently selected data objects 350 may not include the aspect of the search data object 250 that the user is interested in, or the user may simply want to explore other aspects of the search data object 250 to find other data objects 350 in collection 310 that exhibit similar aspects. As shown in FIG. 3D, the user can manipulate control 360 to a different position corresponding to a different aspect of the search data object 250, for example using a cursor control device or through touch screen technology; a value 362B corresponding to the new position maps to a different layer position in the neural network 200. The search data object 250 and new value 362B are submitted to data retrieval system 300 as a query. In some embodiments, the search data object 250 is input to neural network 200 to compute features for search data object 250 that correspond to different aspects of the data object at multiple layers in the neural network 200. In some embodiments, the features and/or descriptors 220 generated in response to the first query as shown in FIG. 3A are persisted in a memory, and so neural network 220 processing of search data object 250 is not performed in response to input of the new value 362B. The value 362B is mapped to a layer position in neural network 200; in this example, referring to FIG. 2, the value 362B maps to a position between layers 210A and 210B. Retrieval engine 370 obtains a descriptor 220B generated from a combination of features output by layers 210A and 210B, or alternatively generates a descriptor 220B from a combination of features output by layers 210A and 210B. The retrieval engine 370 then compares the descriptor 220B to corresponding neural network layer descriptors 320 for data objects 350 in collection 310 to select one or more data objects 350 in the collection 310 that include aspects similar to the aspect of the search data object 250 that corresponds to value 362B. Indications (352D, 352E, 352F . . . ) of the selected data object(s) 350 are provided to the interface 330 for display to the user.

The user can continue to manipulate control 360 to different positions corresponding to a different aspects of the search data object 250 and to review the results of the respective queries at the different positions until the user finds a set (or sets) of data objects 350 that the user is interested in. In some embodiments, copies of one or more of the selected data objects 350 can be obtained from the collection 310 by the user. For example, interface 330 may include a "get copy" user interface element via which a user can request a copy of a specified data object 350. Thus, embodiments allow the user to explore different aspects of the search data object 250 (e.g., a query image) to find data objects 350 that include aspects similar to the aspect of the search data object 250 that the user is interested in. Note that the user need not be aware that the position of control 360 corresponds to layer positions of a neural network 200; to the user, different positions of the control 360 return different sets of data objects 350 (e.g., images) that correspond to different aspects of the search data object 250 as results.

Figure 4:
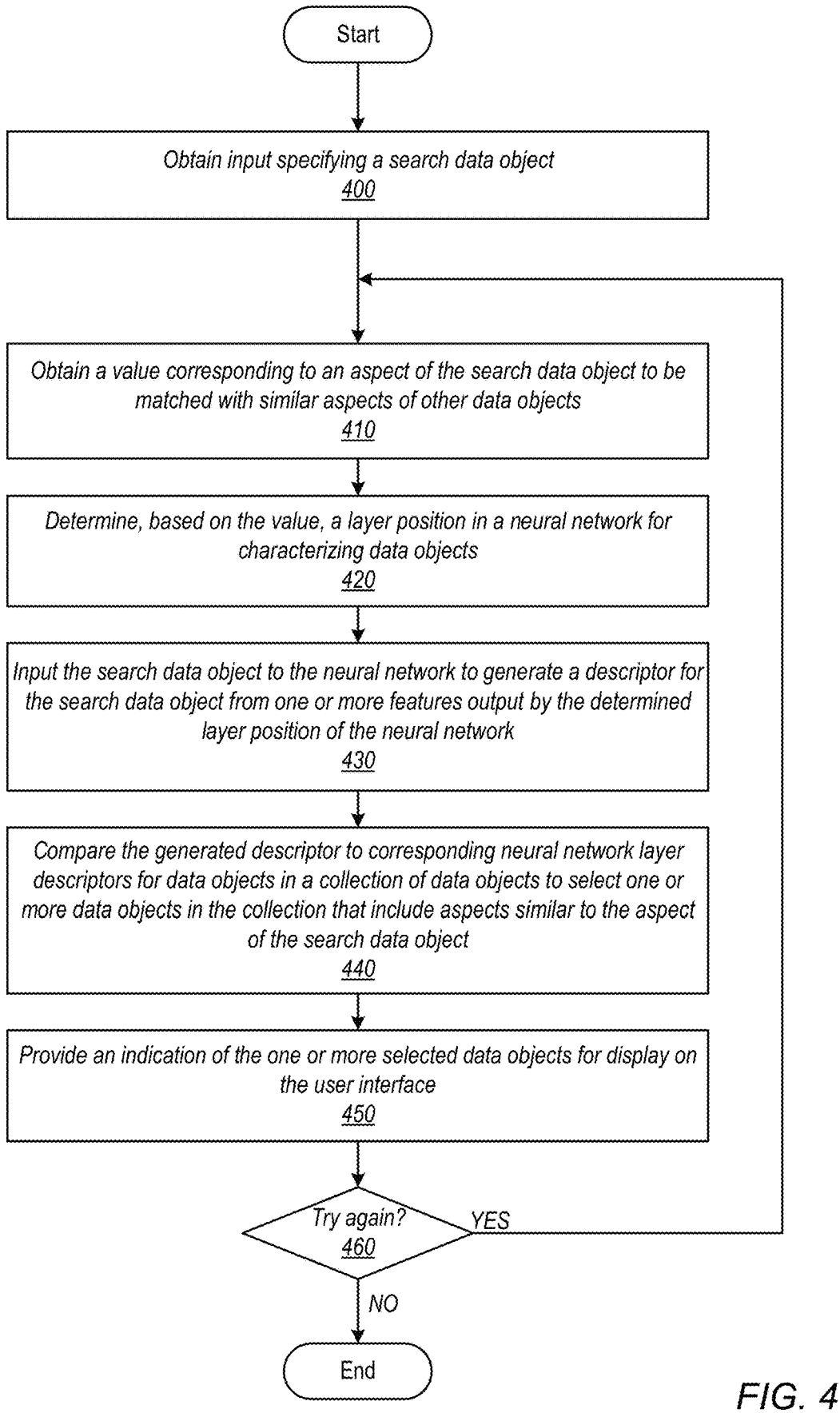
FIG. 4 is a flowchart of a method of operation for a data retrieval system as illustrated in FIGS. 3A through 3C, according to some embodiments.

FIG. 4 is a flowchart of a method of operation for a data retrieval system as illustrated in FIGS. 3A and 3B, according to some embodiments. As indicated at 400, input specifying a search data object (e.g., an image or a portion of an image) is obtained. In some embodiments, a user interface to the data retrieval system includes one or more user interface elements via which the user can specify or select a data object, for example an image or a portion of an image, for which the user is interested in locating data objects with similar aspects.

As indicated at 410, a value corresponding to an aspect of the search data object to be matched with similar aspects of other data objects is obtained. In some embodiments, the user interface to the data retrieval system includes a user interface element, for example a slider bar or dial, that the user can manipulate, for example using a cursor control device or through touch screen technology, to select different positions on the user interface element that correspond to different values. The different values map to different layer positions of a neural network that characterizes data objects, for example a deep neural network 200 as illustrated in FIG. 2.

As indicated at 420, the system may determine, based on the value, a layer position in the neural network. The layer position can be at a particular layer of the neural network, or between two layers.

As indicated at 430, the search data object is input to the neural network to generate a descriptor for the search data object from one or more features output by the determined layer position of the neural network. If the layer position is at a particular layer of the neural network, a descriptor is generated from features output by that layer. If the layer position is between two layers, a descriptor is generated from a combination of features output by the two closest layers.

As indicated at 440, the generated descriptor is compared to corresponding neural network layer descriptors for data objects in a collection of data objects to select one or more data objects in the collection that include aspects similar to the aspect of the search data object. As indicated at 450, an indication of the one or more selected data objects (e.g., names and/or descriptions of the data objects, image thumbnails, lower-resolution versions of full-sized images, etc.) is provided for display on the user interface. In some embodiments, the user can select particular data objects via the user interface to further review the selected data objects; for example, the user can select an image thumbnail or image file name to view the image, or select an audio file name to play at least a portion of the audio file. In some embodiments, the search data object (e.g., an image or a portion of an image) can be displayed so that the user can compare the selected data objects to the search data object.

The user can review the currently selected data objects via the user interface to determine if the data objects are or include what the user is looking for; that is, to determine if the data objects exhibit aspects or characteristics similar to aspects or characteristics of the search data object that the user is interested in. For example, for images, the user can view the selected images to determine if the images include background aspects, lighting aspects, color aspects, or semantic content (e.g., foreground objects) that the user is interested in.

At 460, if the currently selected data objects do not exhibit the aspect of the search data object that the user is interested in, or if the user wants to view data objects that match other aspects of the search data object, then the user can manipulate the user interface element (e.g., slider bar) to change the value that is mapped to the layer positions of the neural network; the method returns to element 410. A new layer position is determined, a descriptor is generated for the search data object from features output by one or more neural network layers at the new layer position, and a new set of data objects is selected from the collection based on the new descriptor and displayed to the user via the user interface. Thus, embodiments allow the user to explore different aspects of the search data object (e.g., a query image) to find a set of data objects that include aspects similar to the aspect of the search data object that the user is interested in. Note that the user need not be aware that the position of the slider bar corresponds to layer positions of a neural network; to the user, different positions on the slider bar return different sets of data objects (e.g., images) that correspond to different aspects of the search data object as results.

Figure 5:
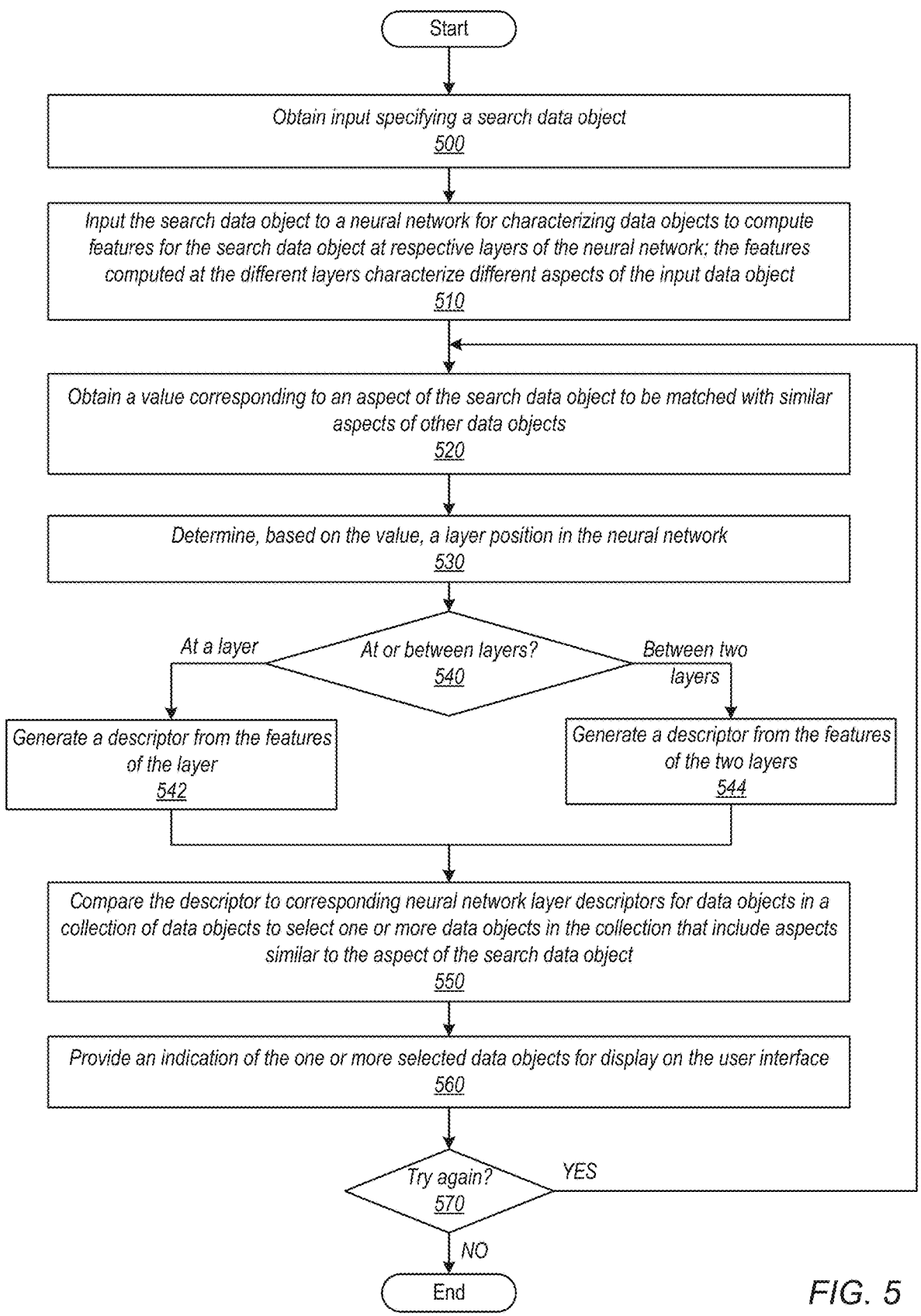
FIG. 5 is a flowchart of another method of operation for a data retrieval system as illustrated in FIGS. 3A through 3C, according to some embodiments.

FIG. 5 provides another flowchart of a method of operation for a data retrieval system as illustrated in FIGS. 3A and 3B, according to some embodiments.

As indicated at 500, input specifying a search data object (e.g., an image or a portion of an image) is obtained. In some embodiments, a user interface to the data retrieval system includes one or more user interface elements via which the user can specify or select a data object, for example an image or a portion of an image, for which the user is interested in locating data objects with similar aspects.

As indicated at 510, the search data object may be input to a neural network for characterizing data objects, for example a deep neural network 200 as illustrated in FIG. 2, to compute features for the search data object at respective layers of the neural network; the features computed at the different layers characterize different aspects of the input data object. In some embodiments, descriptors for different layer positions of the neural network, including layer positions at and between the layers, can be generated from the features output at the layer positions at this time. The features and/or descriptors may be persisted to a memory.

As indicated at 520, a value corresponding to an aspect of the search data object to be matched with similar aspects of other data objects is obtained. In some embodiments, the user interface to the data retrieval system includes a user interface element, for example a slider bar or dial, that the user can manipulate, for example using a cursor control device or through touch screen technology, to select different positions on the user interface element that correspond to different values. The different values map to different layer positions of the neural network.

As indicated at 530, the system may determine, based on the value, a layer position in the neural network. The layer position can be at a particular layer of the neural network, or between two layers. At 540, if the layer position is at a layer, then as indicated at 542 a descriptor is generated from the features computed at that layer. Alternatively, in some embodiments, a descriptor generated at element 510 may be obtained. At 540, if the layer position is between two layers, then as indicated at 544 a descriptor is generated from a combination of the features computed at the two closest layers. Alternatively, in some embodiments, a descriptor generated at element 510 may be obtained.

At 550, the generated descriptor is compared to corresponding neural network layer descriptors for data objects in a collection of data objects to select one or more data objects in the collection that include aspects similar to the aspect of the search data object. As indicated at 560, an indication of the one or more selected data objects (e.g., names and/or descriptions of the data objects, image thumbnails, lower-resolution versions of full-sized images, etc.) is provided for display on the user interface. In some embodiments, the user can select particular data objects to further review the selected data objects; for example, the user can select an image thumbnail or image file name to view the image, or select an audio file name to play at least a portion of the audio file. In some embodiments, the search data object (e.g., an image or a portion of an image) can be displayed so that the user can compare the selected data objects to the search data object.

The user can review the currently selected data objects via the user interface to determine if the data objects are or include what the user is looking for; that is, to determine if the data objects exhibit aspects or characteristics similar to aspects or characteristics of the search data object that the user is interested in. For example, for images, the user can view the selected images to determine if the images include background aspects, lighting aspects, color aspects, or semantic content (e.g., foreground objects) that the user is interested in.

At 570, if the currently selected data objects do not exhibit the aspect of the search data object that the user is interested in, or if the user wants to view data objects that match other aspects of the search data object, then the user can manipulate the user interface element (e.g., slider bar) to change the value that is mapped to the layer positions of the neural network; the method returns to element 520. A new layer position is determined, a new set of data objects is selected from the collection based on a descriptor corresponding to the new layer position, and the new set of data objects is displayed to the user via the user interface. Thus, embodiments allow the user to explore different aspects of the search data object (e.g., a query image) to find a set of data objects that include aspects similar to the aspect of the search data object that the user is interested in. Note that the user need not be aware that the position of the slider bar corresponds to layer positions of a neural network; to the user, different positions on the slider bar return different sets of data objects (e.g., images) that correspond to different aspects of the search data object as results.

Figure 6:
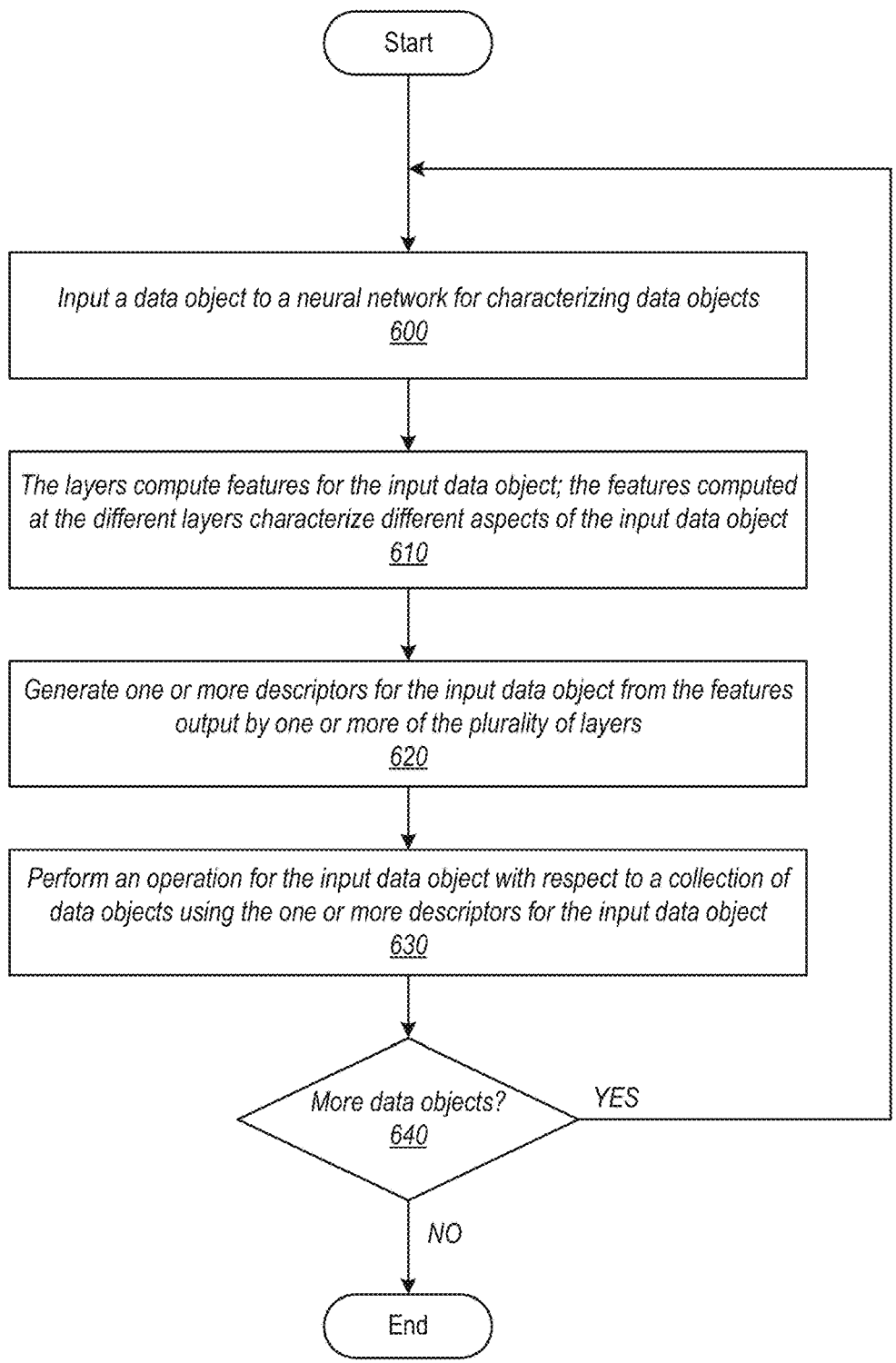
FIG. 6 is a flowchart of a method for performing operations for data objects based on features of the data objects output by two or more layers of a neural network as illustrated in FIG. 2, according to some embodiments.

FIG. 6 is a flowchart of a method for performing operations based on features of the data objects output by one or more layers of a neural network as illustrated in FIG. 2, according to some embodiments. As indicated at 600, a data object is input to a neural network for characterizing data objects, for example a deep neural network 200 as illustrated in FIG. 2. As an example, the data object is a digital image or a portion of an image.

As indicated at 610, the layers of the neural network compute features for the input data object; the features computed at the different layers characterize different aspects of the input data object. Features output at shallower layers of the neural network generally include structural or statistical features of the input data object such as background and lighting features of an image, while features output at deeper layers include semantic features such as edges and details of objects in an image (e.g., a bicyclist or person). Features output at middle layers generally represent the overall structure of the input data object, such as the overall setting of a scene in an image (e.g., a street scene with trees or buildings).

As indicated at 620, one or more descriptors are generated for the input data object from the features output by one or more of the plurality of layers. A descriptor can be generated from features output by one layer, or alternatively can be generated from a combination of features output by two neighboring layers.

As indicated at 630, an operation is performed for the input data object with respect to a collection of data objects using the one or more descriptors for the input data object. For example, an indexing operation can be performed in which the input data object and the descriptors generated for the input data object are added to the collection of data objects, for example as illustrated in FIG. 3A. As another example, a retrieval operation can be performed in which at least one of the descriptors generated for the input data object is compared to corresponding neural network layer descriptors for data objects in the collection to select one or more data objects in the collection that include aspects that are similar to an aspect of the input data object, for example as illustrated in FIGS. 3B and 3C.

In some embodiments, to perform a retrieval operation, a value is obtained corresponding to an aspect of the input data object to be matched with similar aspects of other data objects from a user interface element of a user interface; the user interface element can, for example, be a slider bar that is adjustable to select from a range of aspects. A layer position in the neural network is determined based on the value. A descriptor for the input data object generated from the features output by the determined layer position is compared to corresponding neural network layer descriptors for the data objects in the collection to select one or more data objects in the collection that include aspects similar to the aspect of the input data object. An indication of the one or more selected data objects is displayed on the user interface. The user can adjust the user interface element (e.g., slider bar) to change the value that is mapped to the layer positions of the neural network. A new layer position is determined, a new set of data objects is selected from the collection based on a descriptor corresponding to the new layer position, and the new set of data objects is displayed to the user via the user interface.

At 640, if there are more data objects to be processed, then the method returns to element 600 to obtain and process a next data object. Otherwise, the method is done.

FIGS. 7A through 7D illustrate example implementations of a data retrieval system, according to some embodiments. Note that these examples are not intended to be limiting; other implementations are possible. An example computing device that can be used as any of the devices shown in FIGS. 7A through 7D is illustrated in FIG. 10.

Figure 7A:
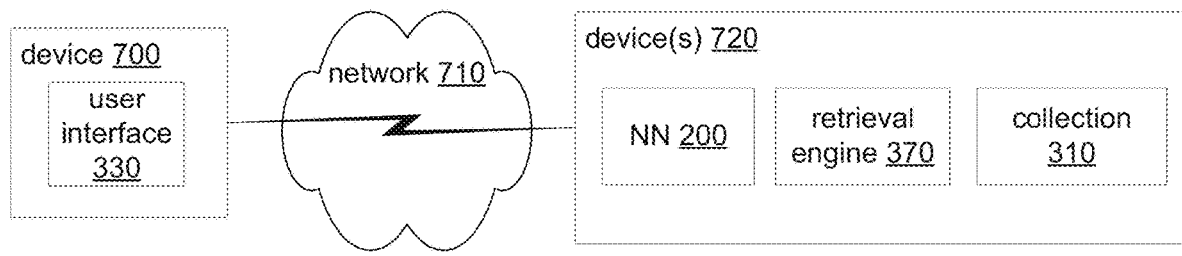
FIGS. 7A through 7D illustrate example implementations of a data retrieval system, according to some embodiments.

FIG. 7A shows an example implementation in which the interface 330 is implemented on a device 700, and the neural network 200, retrieval engine 370, and collection 310 are implemented on one or more other devices 720. Device 700 can, for example, be a mobile multipurpose device such as a smartphone or tablet/pad device, or a personal computer such as a desktop, laptop, or notebook computer. Device(s) 720 can, for example, include one or more application or web server systems. In some embodiments, device 700 communicates with device(s) 720 via a wired and/or wireless connection over an intermediate network 710 such as the Internet. Interface 330 can, for example, be implemented as a web browser interface, mobile application or applet, or other type of application on device 700.

Figure 7B:
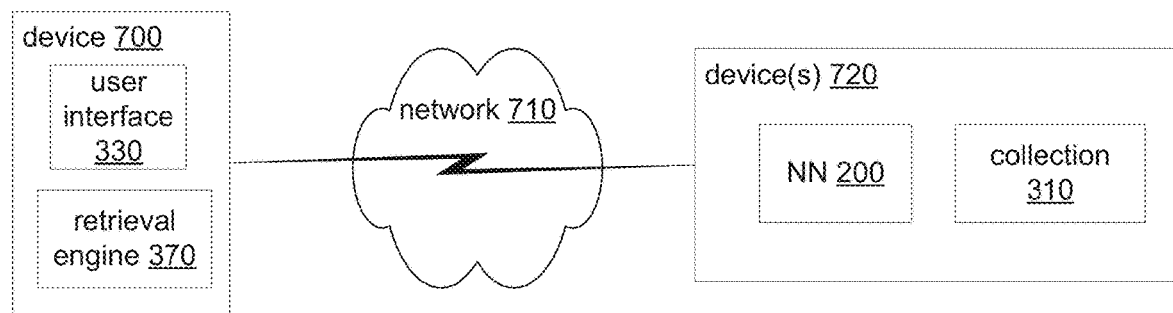

FIG. 7B shows an example implementation in which the interface 330 and retrieval engine 370 are implemented on a device 700, and the neural network 200 and collection 310 are implemented on one or more other devices 720. Device 700 can, for example, be a mobile multipurpose device such as a smartphone or tablet/pad device, or a personal computer such as a desktop, laptop, or notebook computer. Device(s) 720 can, for example, include one or more application or web server systems. In some embodiments, device 700 communicates with device(s) 720 via a wired and/or wireless connection over an intermediate network 710 such as the Internet. Interface 330 and retrieval engine 370 can, for example, be implemented as a web browser interface, mobile application or applet, or other type of application on device 700.

Figure 7C:
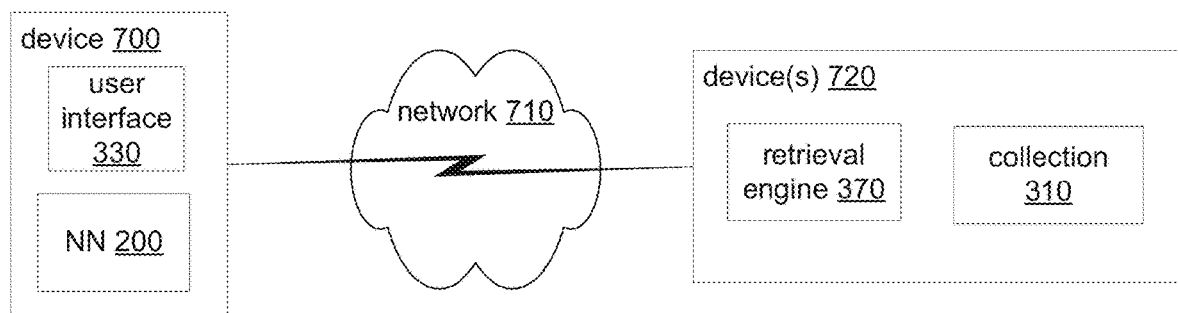

FIG. 7C shows an example implementation in which the interface 330 and neural network 200 are implemented on a device 700, and the retrieval engine 370 and collection 310 are implemented on one or more other devices 720. Device 700 can, for example, be a mobile multipurpose device such as a smartphone or tablet/pad device, or a personal computer such as a desktop, laptop, or notebook computer. Device(s) 720 can, for example, include one or more application or web server systems. In some embodiments, device 700 communicates with device(s) 720 via a wired and/or wireless connection over an intermediate network 710 such as the Internet to send data objects and descriptors generated for the data objects by the neural network 200 to the retrieval 370 and to receive results from the retrieval engine 370. Interface 330 and neural network 200 can, for example, be implemented as a web browser interface, mobile application or applet, or other type of application on device 700. In some embodiments, a neural network 200 can also be implemented on device(s) 720 to index data objects in the collection 310.

Figure 7D:
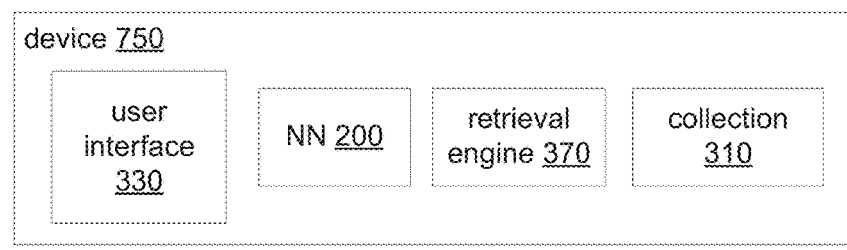

FIG. 7D shows an example implementation in which the interface 330, retrieval engine 370, neural network 200 and collection 310 are implemented on a device 750. Device 750 can, for example, be a mobile multipurpose device such as a smartphone or tablet/pad device, a personal computer such as a desktop, laptop, or notebook computer, or other types of computing devices. Interface 330 and retrieval engine 370 can, for example, be implemented as a mobile application or applet, or other type of application, on device 750.

Embodiments of the data retrieval system have been described that allow users to select different aspects of a search data object to be matched with similar aspects of other data objects in a collection. In some embodiments, the data retrieval system allows users to select multiple aspects of a search data object to be used in a search of the collection, and/or to select aspects of two or more data objects to be used in a search of the collection. In these embodiments, an interface 330 to the system 300 as shown in FIGS. 3A-3C includes a "save aspect" or similar user interface element via which the user can save particular aspects of the search data object 250 that the user has identified by inputting different values via user control 360. In some embodiments, selecting the "save aspect" user interface element causes the system 300 to store or mark the descriptor 220 corresponding to the respective aspect. The user can then use the user control 360 to search for, identify, and save one or more other aspects of the search data object 250. The interface 330 also includes a "search using saved aspects" or similar user interface element that, when selected by the user, causes the retrieval engine 370 to search for matching data objects 350 in collection 310 using a combination of the stored or marked descriptors 220 for the search data object 250, and return one or more data object 352 that best match the combination of aspects.

In some embodiments, the system 300 allows the user to search for, identify, and save one or more aspects of two or more search data objects 250. The system 300 stores or marks descriptors 220 corresponding to aspects of the two or more search data objects 250 that are saved by the user via the "save aspect" user interface element. The user can select the "search using saved aspects" user interface element, which causes the retrieval engine 370 to search for matching data objects 350 in collection 310 using a combination of the stored or marked descriptors 220 for the two or more search data objects 250, and return one or more data object 352 that best match the combination of aspects from the two or more search data objects 250.

Figure 8:
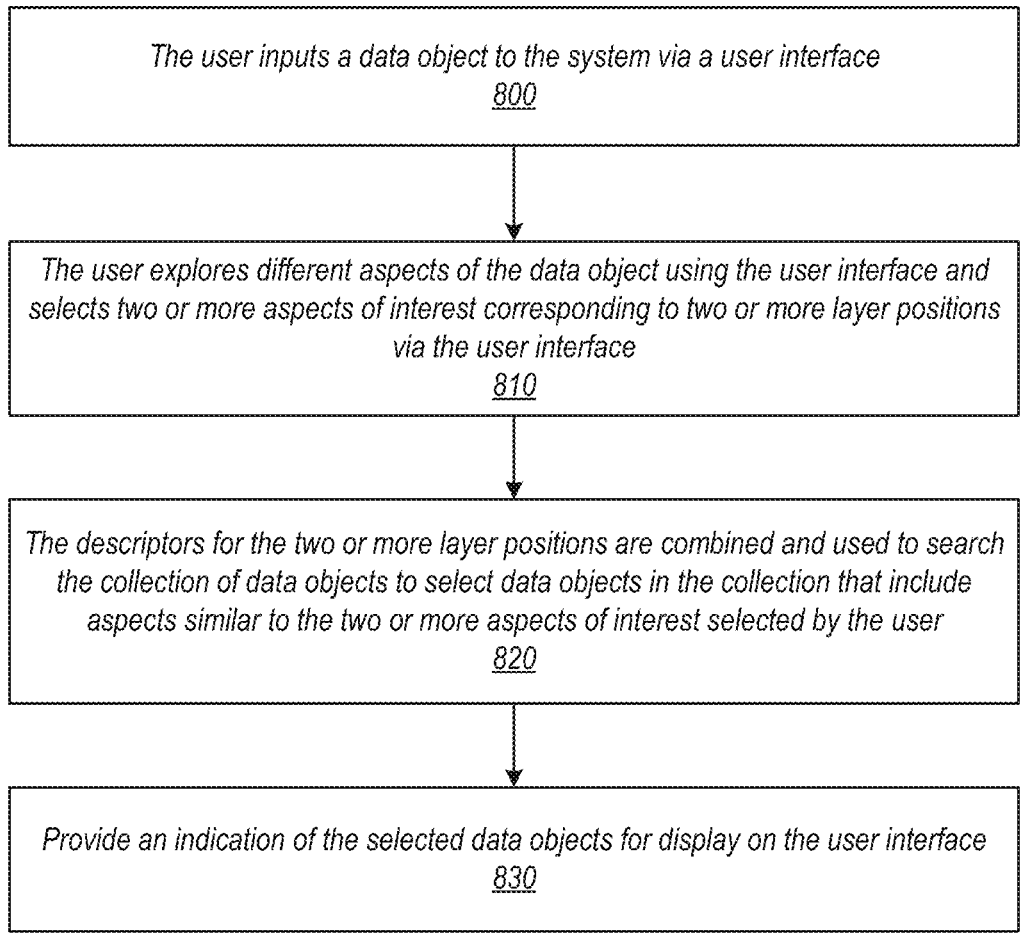
FIG. 8 is a high-level flowchart of a method for selecting multiple aspects of a search data object for searching a collection of data objects, according to some embodiments.

FIG. 8 is a high-level flowchart of a method for selecting multiple aspects of a search data object for searching a collection of data objects, according to some embodiments. As indicated at 800, the user inputs a data object to the system via a user interface. As indicated at 810, the user explores different aspects of the data object using the user interface and selects two or more aspects of interest corresponding to two or more layer positions via the user interface. The system stores or marks descriptors corresponding to the selected aspects. As indicated at 820, the descriptors for the two or more layer positions are combined and used to search the collection of data objects to select data objects in the collection that include aspects similar to the two or more aspects of interest selected by the user. As indicated at 830, an indication of the one or more selected data objects (e.g., names and/or descriptions of the data objects, image thumbnails, lower-resolution versions of full-sized images, etc.) are provided for display on the user interface.

Figure 9:
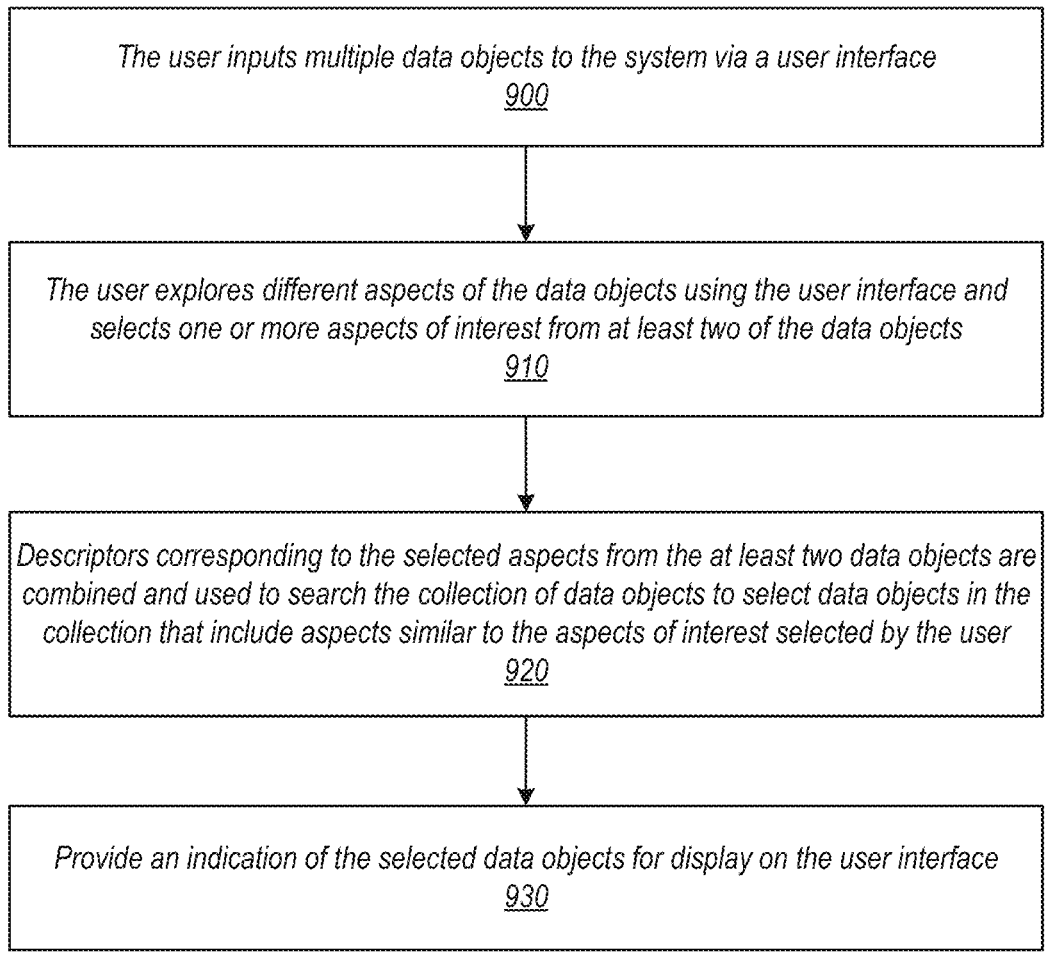
FIG. 9 is a high-level flowchart of a method for selecting aspects in multiple data objects for searching a collection of data objects, according to some embodiments.

FIG. 9 is a high-level flowchart of a method for selecting aspects in multiple data objects for searching a collection of data objects, according to some embodiments. As indicated at 900, the user inputs multiple data objects to the system via a user interface. As indicated at 910, the user explores different aspects of the data objects using the user interface and selects one or more aspects of interest from at least two of the data objects. The system stores or marks descriptors corresponding to the selected aspects. As indicated at 920, descriptors corresponding to the selected aspects from the at least two data objects are combined and used to search the collection of data objects to select data objects in the collection that include aspects similar to the aspects of interest selected by the user. As indicated at 930, an indication of the one or more selected data objects (e.g., names and/or descriptions of the data objects, image thumbnails, lower-resolution versions of full-sized images, etc.) are provided for display on the user interface.

Example Use Cases

Embodiments of a data retrieval system as illustrated in FIGS. 2 through 9 can be used in any of a variety of applications, including but not limited to user experience applications, for example on mobile multipurpose devices, and machine learning applications. The following provides some example use cases for embodiments of a data retrieval system as illustrated in FIGS. 2 through 9.

An example use case is in generic image searching and retrieval for image curation applications. Embodiments enable searches for objects in or other aspects of images for which there is not an ad-hoc trained classification algorithm; the located images can then be sent for annotation in the curation application.

Another example use case is bootstrap training for object classification or object detection algorithms. Embodiments allow images with a specific feature to be quickly identified and retrieved in order to train a classification algorithm to detect the feature, or to train a detection algorithm to detect desired objects as well as their positions in images.

Another example use case is in training neural networks. Embodiments allow images with a specific feature or features to be quickly identified and retrieved using one neural network in order to train another neural network for those feature(s).

Another example use case is in diagnosing neural networks. For example, a user may have two images that should be considered similar, but for some reason the neural network classifies the images as different. The user can use the system to compare the two images using the slider to select different aspects at different levels of the neural network to determine at which layer position the images diverge. This information can be used to determine that from the input layer to the diverging point the network is well-trained, but the neural network needs to be refined from the diverging point to the output layer. The first part of the network can then be frozen, and the remainder of the network can be further trained.

Example Computing Device

FIG. 10 illustrates an example computing device, referred to as computer system 2000, that may be used in embodiments of a data retrieval system as illustrated in FIGS. 2 through 9. In different embodiments, computer system 2000 may be any of various types of devices, including, but not limited to, a personal computer system, desktop computer, server, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, which may also be coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may store program instructions 2022 and data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 and data 2032 may include, but are not limited to, program instructions for implementing and data used in embodiments of the data retrieval system as described in reference to FIGS. 2 through 9. In some embodiments, program instructions and/or data may be received, sent or stored upon different types of computer-accessible media or on similar media separate from system memory 2020 or computer system 2000.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, remote sensing systems such as LIDAR systems etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
    performing, by one or more computing devices:
        obtaining input specifying a search data object from a first user interface element of a user interface;
        obtaining a value corresponding to an aspect of the search data object to be matched with similar aspects of other data objects from a second user interface element of the user interface, wherein the second user interface element is adjustable to select from a range of values that maps to layer positions in a plurality of hidden layers of a neural network for characterizing data objects;
        determining, based on the value, a layer position in the neural network for characterizing data objects;
        inputting the search data object to the neural network to generate a descriptor for the search data object from one or more features output by the determined layer position of the neural network;
        comparing the generated descriptor to corresponding neural network layer descriptors for data objects in a collection of data objects to select one or more data objects in the collection that include aspects similar to the aspect of the search data object; and
        providing an indication of the one or more selected data objects for display on the user interface.

2. The method as recited in claim 1, wherein the neural network comprises a plurality of layers, wherein a first layer of the plurality of layers computes features for an input data object, wherein each subsequent layer computes additional features for the input data object based on the features output from a previous layer, and wherein the features computed at the different layers characterize different aspects of the input data object.

3. The method as recited in claim 2, wherein the layer position is at one of the plurality of layers, and wherein the descriptor for the search data object is generated from the features output by the respective layer.

4. The method as recited in claim 2, wherein the layer position is between two of the plurality of layers, and wherein the descriptor for the search data object is generated from a combination of the features output by the respective two layers.

5. The method as recited in claim 1, further comprising:
    obtaining a different value corresponding to a different aspect of the search data object from the second user interface element of the user interface;
    determining, based on the different value, a different layer position in the neural network;
    comparing a descriptor for the search data object generated from features output by the different layer position to corresponding neural network layer descriptors generated from features output by the different layer position for the data objects in the collection to select one or more other data objects in the collection that include aspects that are similar to the different aspect of the search data object; and
    providing an indication of the one or more other selected data objects for display on the user interface.

6. The method as recited in claim 1, wherein the second user interface element is a slider, and wherein the obtained value indicates a currently selected position on the slider.

7. The method as recited in claim 1, wherein the data objects include digital images or portions of digital images.

8. The method as recited in claim 1, further comprising:
    comparing two or more descriptors for the search data object generated from features output by two or more layer positions of the neural network to corresponding neural network layer descriptors for the data objects in the collection to select at least one data object in the collection that includes aspects that are similar to two or more aspects of the search data object; and
    providing an indication of the at least one selected data object for display on the user interface.

9. The method as recited in claim 1, further comprising:
comparing descriptors for two or more search data objects generated from features output by layer positions of the neural network to corresponding neural network layer descriptors for the data objects in the collection to select at least one data object in the collection that includes aspects that are similar to aspects of the two or more search data objects; and
providing an indication of the at least one selected data object for display on the user interface.

10. A system, comprising:
one or more processors; and
a memory comprising program instructions that are executable by the one or more processors to:
obtain a value corresponding to an aspect of a data object from a user interface element of a user interface, wherein the user interface element is adjustable to select from a range of values that maps to layer positions in a plurality of hidden layers of a neural network for characterizing data objects;
input the data object to the neural network for characterizing data objects, wherein the neural network comprises a plurality of layers, wherein a first layer of the plurality of layers computes features for the input data object, and each subsequent layer of the plurality of layers computes additional features for the input data object based on the features output from a previous layer, and wherein the features computed at the different layers characterize different aspects of the input data object;
obtain the features for the input data object output by one or more of the layers of the neural network determined based on the value;
generate one or more descriptors for the input data object from the features output by the one or more layers; and
perform an operation for the input data object with respect to a collection of data objects using the one or more descriptors for the input data object.

11. The system as recited in claim 10, wherein the operation is an indexing operation in which the input data object and the descriptors generated for the input data object are added to the collection of data objects.

12. The system as recited in claim 10, wherein the operation is a retrieval operation in which at least one of the descriptors generated for the input data object is compared to corresponding neural network layer descriptors for data objects in the collection to select one or more data objects in the collection that include aspects that are similar to at least one aspect of the input data object.

13. The system as recited in claim 10, wherein the operation is a retrieval operation, wherein, to perform the retrieval operation, the program instructions are executable by the one or more processors to:
determine, based on the value, a layer position in the neural network;
compare a descriptor for the input data object generated from the features output by the determined layer position to corresponding neural network layer descriptors for the data objects in the collection to select one or more data objects in the collection that include aspects similar to the aspect of the input data object; and
cause an indication of the one or more selected data objects to be displayed on the user interface.

14. The system as recited in claim 13, wherein the layer position is at one of the plurality of layers, and wherein the descriptor for the input data object is generated from the features output by the respective layer.

15. The system as recited in claim 13, wherein the layer position is between two of the plurality of layers, and wherein the descriptor for the input data object is generated from a combination of the features output by the respective two layers.

16. A non-transitory computer-readable storage medium storing program instructions that when executed on one or more computers cause the one or more computers to:
obtain a search data object;
obtain a value corresponding to an aspect of the search data object to be matched with similar aspects of other data objects from a user interface element of a user interface, wherein the user interface element is adjustable to select from a range of values that maps to layer positions in a plurality of hidden layers of a neural network for characterizing data objects;
determine, based on the value, a layer position in the neural network for characterizing data objects;
input the search data object to the neural network to generate a descriptor for the search data object from one or more features output by the determined layer position of the neural network; and
compare the generated descriptor to corresponding neural network layer descriptors for data objects in a collection of data objects to select one or more data objects in the collection that include aspects similar to the aspect of the search data object.

17. The non-transitory computer-readable storage medium as recited in claim 16, wherein the neural network comprises a plurality of layers, wherein a first layer of the plurality of layers computes features for an input data object, wherein each subsequent layer computes additional features for the input data object based on the features output from a previous layer, and wherein the features computed at the different layers characterize different aspects of the input data object.

18. The non-transitory computer-readable storage medium as recited in claim 17, wherein the layer position is at one of the plurality of layers, and wherein the descriptor for the search data object is generated from the features output by the respective layer.

19. The non-transitory computer-readable storage medium as recited in claim 17, wherein the layer position is between two of the plurality of layers, and wherein the descriptor for the search data object is generated from a combination of the features output by the respective two layers.

20. The non-transitory computer-readable storage medium as recited in claim 16, wherein the program instructions, when executed on the one or more computers, further cause the one or more computers to:
obtain a different value corresponding to a different aspect of the search data object;
determine, based on the different value, a different layer position in the neural network; and
compare a descriptor for the search data object generated from features output by the different layer position to corresponding neural network layer descriptors generated from features output by the different layer position for the data objects in the collection to select one or more other data objects in the collection that include aspects that are similar to the different aspect of the search data object.

* * * * *